US012344506B2

(12) United States Patent
Kariya et al.

(10) Patent No.: US 12,344,506 B2
(45) Date of Patent: Jul. 1, 2025

(54) ELEVATOR PASSENGER CAR AND ELEVATOR HAVING SAME CAR

(71) Applicant: Hitachi, Ltd., Tokyo (JP)

(72) Inventors: Tomoki Kariya, Tokyo (JP); Katsuhiro Shimada, Tokyo (JP); Hiroshi Kawakami, Tokyo (JP); Yoshiki Tomura, Tokyo (JP); Mari Osuga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 902 days.

(21) Appl. No.: 17/604,129

(22) PCT Filed: Apr. 19, 2019

(86) PCT No.: PCT/JP2019/016736
§ 371 (c)(1),
(2) Date: Oct. 15, 2021

(87) PCT Pub. No.: WO2020/213147
PCT Pub. Date: Oct. 22, 2020

(65) Prior Publication Data
US 2022/0227602 A1 Jul. 21, 2022

(51) Int. Cl.
*B66B 11/02* (2006.01)

(52) U.S. Cl.
CPC ...... *B66B 11/0206* (2013.01); *B66B 11/0273* (2013.01)

(58) Field of Classification Search
CPC ............. B66B 11/0206; B66B 11/0273; B66B 11/026; B66B 11/02; B66B 11/0213; B66B 11/022; B66B 11/0286
See application file for complete search history.

(56) References Cited

U.S. PATENT DOCUMENTS 4,249,640 A * 2/1981 Darwent ............. B66B 11/0226 187/401
4,361,208 A * 11/1982 Jackson .............. B66B 11/0206 187/401
(Continued)

FOREIGN PATENT DOCUMENTS

CN 101311097 A * 11/2008 ......... B66B 11/0206
CN 201309788 Y * 9/2009
(Continued)

OTHER PUBLICATIONS

Indian Office Action received in corresponding Indian Application No. 202117047362 dated Sep. 6, 2022.
(Continued)

*Primary Examiner* — Minh Truong
*Assistant Examiner* — Michelle M Mudwilder
(74) *Attorney, Agent, or Firm* — MATTINGLY & MALUR, PC

(57) ABSTRACT

An elevator passenger car allows enhancement of rigidity of a lower beam with a simple configuration while suppressing an increase in the number of components, and includes an upper beam disposed at an upper side, a pair of vertical frames having upper ends connected to both ends of the upper beam, a lower beam disposed between lower ends of the pair of vertical frames while having both ends connected, and a pair of underfloor side surface beams which are mounted and connected onto both ends of the lower beam while extending orthogonal thereto. The elevator passenger car has a car room disposed at a part defined by the upper beam, the pair of vertical frames, and the lower beam that is mounted on the pair of underfloor side surface beams. An underfloor side surface beam reinforcing member is provided for each of the pair of underfloor side surface beams.

8 Claims, 5 Drawing Sheets

(56) References Cited

U.S. PATENT DOCUMENTS

| | | | | | |
|---|---|---|---|---|---|
| 4,700,809 | A * | 10/1987 | Lazar | B66B 11/0206 187/401 |
| 4,899,852 | A * | 2/1990 | Salmon | B66B 11/0286 248/581 |
| 5,601,034 | A | 2/1997 | Tao et al. | |
| 5,975,249 | A * | 11/1999 | Tomaseti | B66B 11/0206 187/401 |
| 6,209,686 | B1 * | 4/2001 | Tomasetti | B66B 11/0226 187/401 |
| 9,187,292 | B2 * | 11/2015 | Brügger | B66B 11/0273 |
| 9,511,979 | B2 * | 12/2016 | Maruyama | B66B 11/0206 |
| 9,701,515 | B2 * | 7/2017 | Qiu | B66B 11/02 |
| 2004/0035647 | A1 * | 2/2004 | Arai | B66B 11/0206 187/401 |
| 2017/0349409 | A1 * | 12/2017 | Kato | B66B 7/068 |

FOREIGN PATENT DOCUMENTS

| | | | | |
|---|---|---|---|---|
| CN | 103708326 | A | 4/2014 | |
| CN | 105329758 | A * | 2/2016 | B66B 11/0206 |
| CN | 105555698 | A | 5/2016 | |
| CN | 107416651 | A * | 12/2017 | B66B 11/0206 |
| CN | 107673173 | A * | 2/2018 | B66B 11/0206 |
| CN | 108821072 | A * | 11/2018 | B66B 11/0206 |
| CN | 108840198 | A * | 11/2018 | B66B 11/0273 |
| FR | 2647097 | A1 * | 11/1990 | |
| JP | 56-017412 | Y | 4/1981 | |
| JP | 59-046970 | U | 3/1984 | |
| JP | H08192972 | A * | 7/1996 | |
| JP | H09110340 | A * | 4/1997 | |
| JP | 2012-006695 | A | 1/2012 | |
| JP | 2012-166872 | A | 9/2012 | |
| TW | 306433 | | 5/1997 | |
| WO | 2012/028597 | A1 | 3/2012 | |
| WO | 2015/045097 | A1 | 4/2015 | |

OTHER PUBLICATIONS

International Search Report of PCT/JP2019/016736 dated Jul. 2, 2019.

Taiwan Office Action received in corresponding Taiwanese Application No. 109112786 dated Jun. 22, 2021.

* cited by examiner

ELEVATOR PASSENGER CAR AND ELEVATOR HAVING SAME CAR

TECHNICAL FIELD

The present invention relates to an elevator passenger car, and an elevator provided with the car.

BACKGROUND ART

The art disclosed in PTL 1 has been proposed as the conventional elevator passenger car structure. PTL 1 discloses the car frame constituted by a pair of vertical frames disposed parallel to a pair of guide rails, a lower beam which is provided with a pulley, and connected to lower sections of the pair of vertical frames while making the longitudinal direction horizontally oriented, and an upper beam which is connected to upper sections of the pair of vertical frames while making the longitudinal direction horizontally oriented. The pair of under-car frames fabricated by L-shaped steel is disposed on the upper surface of the lower beam in the direction orthogonal to the longitudinal direction of the lower beam. The pair of under-car frames is connected to a pair of support frames which is disposed in the direction orthogonal to the longitudinal direction of the pair of under-car frames. The pair of under-car frames serves to support a car room.

CITATION LIST

Patent Literature

PTL 1: Japanese Patent Application Laid-Open No. 2012-6695

SUMMARY OF INVENTION

Technical Problem

The elevator passenger car as disclosed in PTL 1 had a disadvantage of insufficient rigidity of the pair of under-car frames for supporting the car room. It was therefore required to connect the pair of under-car frames to the pair of support frames disposed in the direction orthogonal to the longitudinal direction of the pair of under-car frames, resulting in the complicated configuration.

An object of the present invention is to provide an elevator passenger car, which allows enhancement of rigidity of the lower beam with the simple configuration while suppressing an increase in the number of components, and an elevator provided with the passenger car.

Solution to Problem

For attaining the object, the present invention provides an elevator passenger car including an upper beam disposed at an upper side, a pair of vertical frames having upper ends connected to both ends of the upper beam in a longitudinal direction, a lower beam disposed between lower ends of the pair of vertical frames while having both ends connected, and a pair of underfloor side surface beams which is mounted and connected onto the both ends of the lower beam while extending in a direction orthogonal to the lower beam. The elevator passenger car has a car room disposed at a part defined by the upper beam, the pair of vertical frames, and the lower beam. The car room is mounted on the pair of underfloor side surface beams. An underfloor side surface beam reinforcing member is further provided for each of the pair of underfloor side surface beams so as to be reinforced.

The present invention provides an elevator including a hoisting machine, a main rope wound around the hoisting machine, a passenger car provided at one side of the main rope, and a balance weight provided at the other side of the main rope. The passenger car includes a car frame and a car room formed inside the car frame. The car frame includes an upper beam disposed at an upper side, a pair of vertical frames having upper ends connected to both ends of the upper beam in a longitudinal direction, and a lower beam disposed between lower ends of the pair of vertical frames while having both ends connected to the lower ends of the vertical frames. A pair of underfloor side surface beams is mounted and connected to both ends of the lower beam while extending in a direction orthogonal to the lower beam. The car room is mounted on the pair of underfloor side surface beams. An underfloor side surface beam reinforcing member is provided for each of the pair of underfloor side surface beams so as to be reinforced.

Advantageous Effects of Invention

The present invention provides the elevator passenger car which allows enhancement of rigidity of the lower beam with the simple configuration while suppressing an increase in the number of components, and the elevator provided with the passenger car.

DESCRIPTION OF EMBODIMENT

Figure 1:
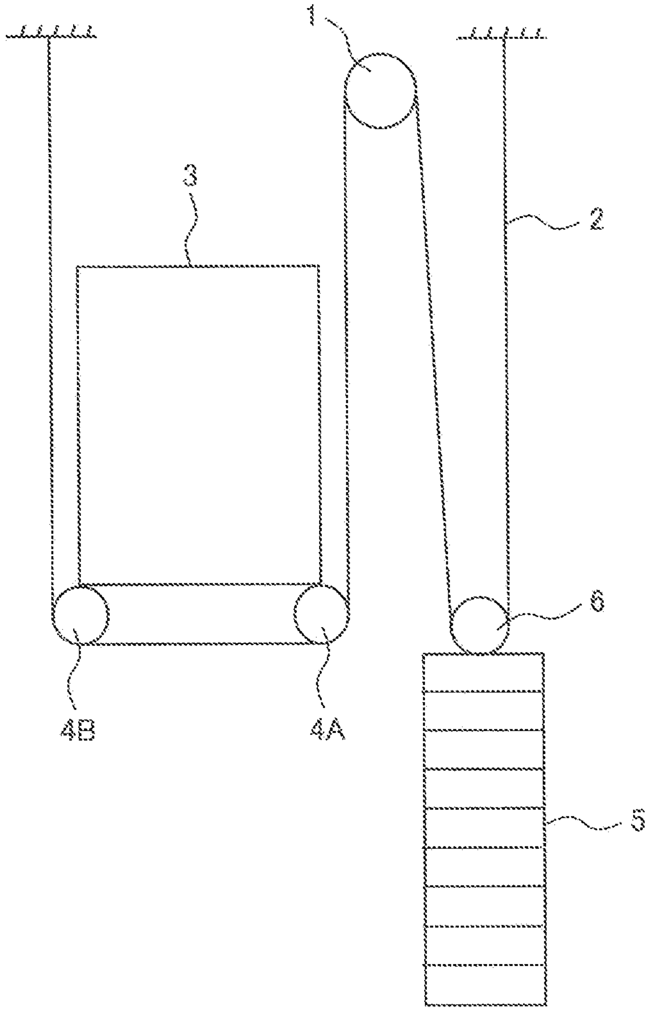
FIG. 1 schematically illustrates a structure of an elevator system according to an embodiment of the present invention.

An embodiment of the present invention will be described referring to the drawings. The same components will be designated with the same reference signs so that the redundant explanations are omitted.

Each of the respective components of the present invention does not have to be independent of each other. The structures as described as follows are allowed. For example, the single component may be constituted by multiple members. Each of the multiple components may be constituted by the single member. A specific component constitutes a part of another component. A part of a specific component may serve as a part of the other component.

FIG. 1 schematically illustrates a structure of an elevator system according to an embodiment of the present invention. Referring to FIG. 1, the elevator system is disposed in an unshown hoistway. One end of a main rope 2 wound around a hoisting machine 1 is suspended through under-car pulleys 4A, 4B disposed below a passenger car 3, and fixed to an upper position of the hoistway. The other end of the main rope 2 is suspended through a pulley 6 above a balance weight 5, and fixed to an upper position of the hoistway. The elevator system is configured to vertically move the passenger car 3 disposed at one side of the main rope, and the balance weight disposed at the other side of the main rope in the hoistway by rotatably driving the hoisting machine 1.

Figure 2:
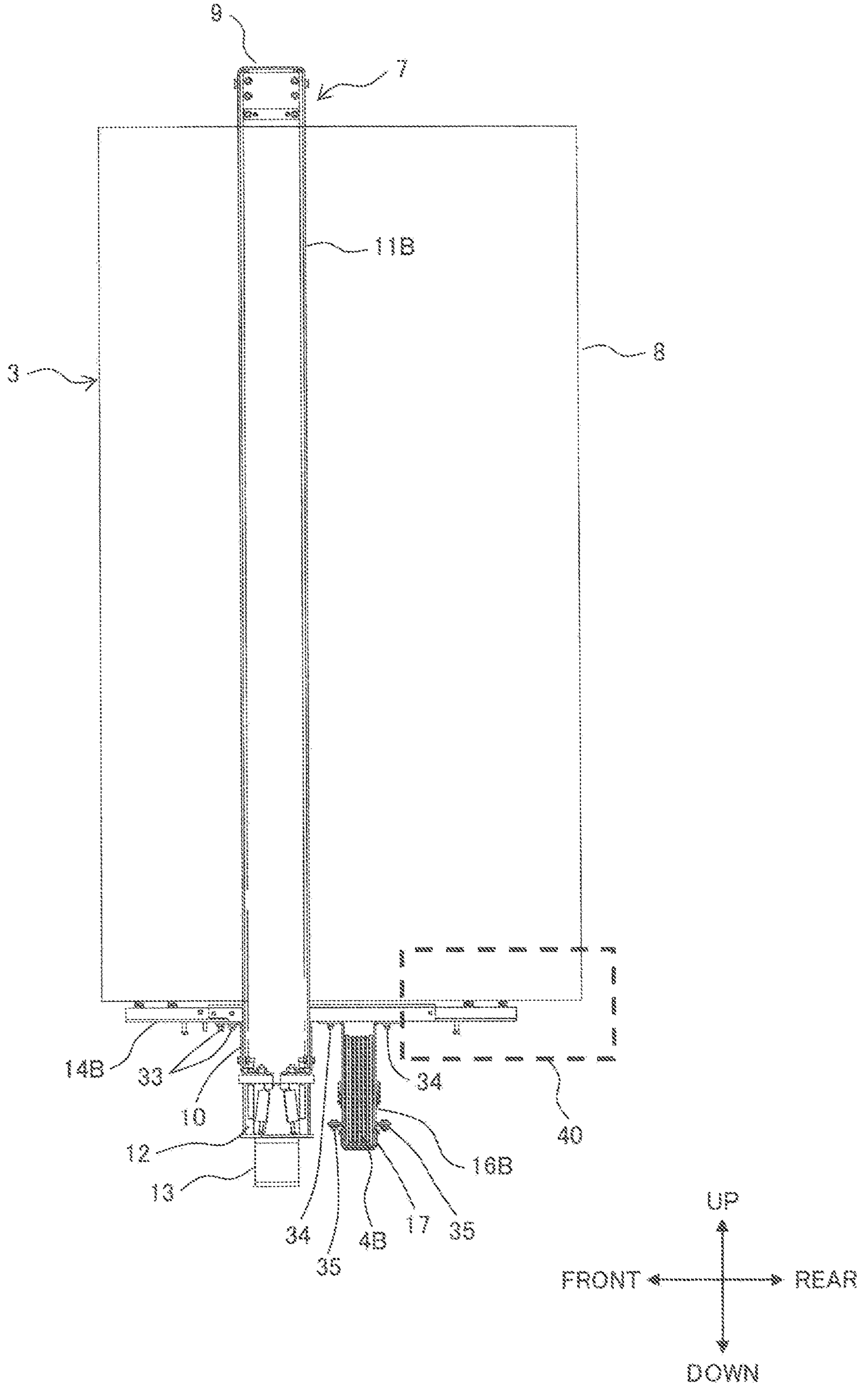
FIG. 2 is an enlarged side view of a passenger car 3 as illustrated in FIG. 1.

FIG. 2 is an enlarged side view of the passenger car 3 as illustrated in FIG. 1. In the embodiment, directions of front-rear, up-down, and left-right are defined on the basis of a sight of a user of the elevator with respect to the passenger car 3 as illustrated in FIG. 2. Referring to FIG. 2, the passenger car 3 includes a car frame 7 and a car room 8 that is formed inside the car frame 7.

The car frame 7 includes an upper beam 9 disposed above the car room 8, a lower beam 10 disposed below the car room 8, and a pair of vertical frames 11A, 11B for connecting the respective ends of the upper beam 9 and the lower beam 10. The vertical frame 11A is not shown in the drawing as it is located at a back side of the car room 8. The car frame 7 is disposed closer to the front side from the center of the front-rear direction of the car room 8. The under-car pulleys 4A, 4B are positioned at the center of the car room 8 in the front-rear direction.

Figure 3:
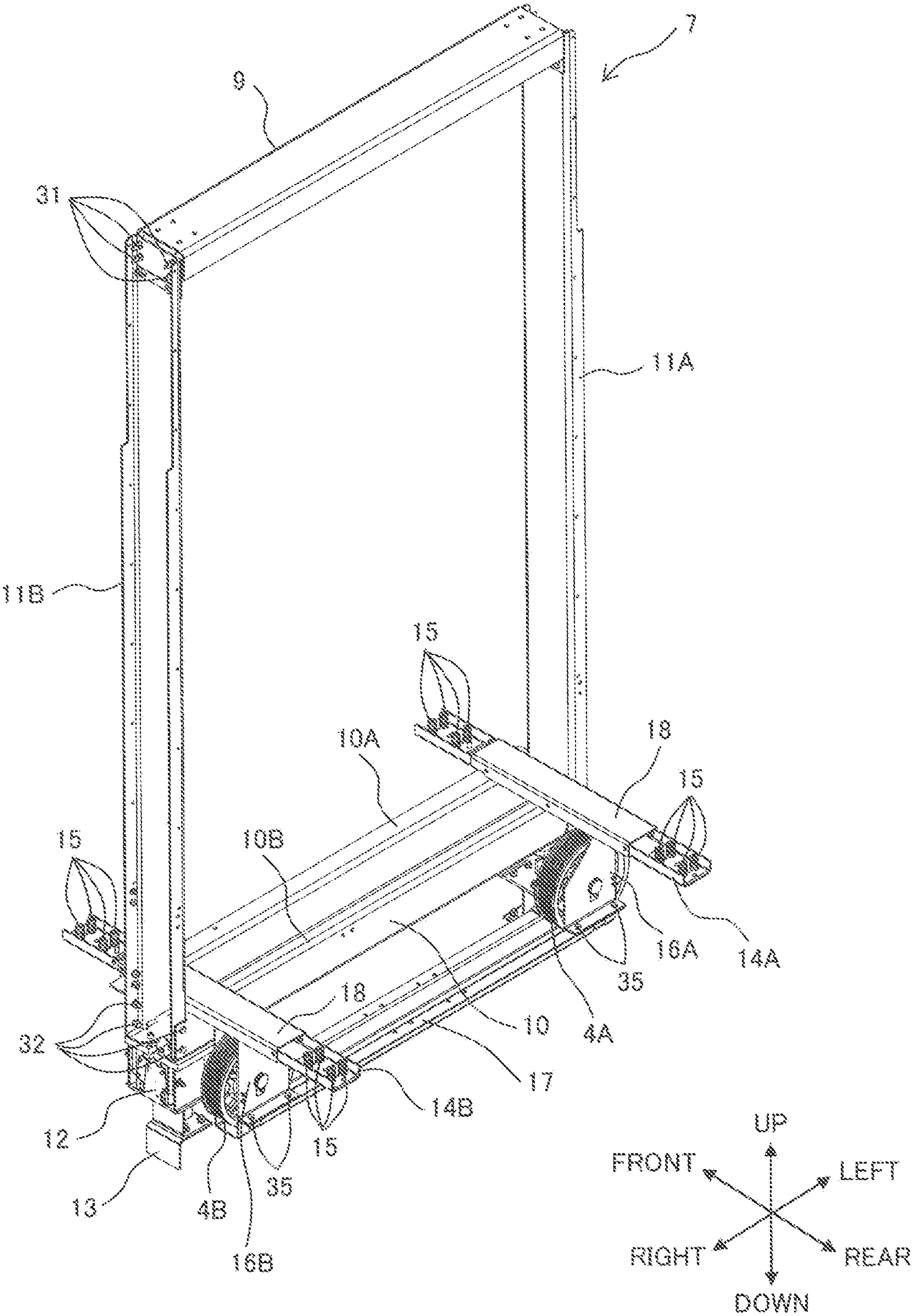
FIG. 3 is a perspective view only of a car frame as illustrated in FIG. 2.

FIG. 3 is a perspective view only of the car frame as illustrated in FIG. 2. Referring to FIG. 3, the car frame 7 is formed by connecting upper ends of the pair of vertical frames 11A, 11B to both longitudinal (left-right direction) ends of the upper beam 9 disposed at the upper side using bolts 31, and connecting lower ends of the pair of vertical frames 11A, 11B to both longitudinal (left-right direction) ends of the lower beam 10 disposed at the lower side using bolts 32.

The lower beam 10 formed to have a U-like shape with an upper open section includes a mount part 10A having one upper end bent outward (front side), and a mount part 10B having the other upper end bent inward (front side). The car frame 7 is disposed along an unshown guide rail. An emergency stop device 12 disposed below the lower beam 10 applies braking force to the passenger car 3 via the guide rails when the speed of the passenger car 3 exceeds the predetermined fall speed so that the passenger car 3 is stopped. A guide device bracket 13 is disposed below the emergency stop device 12 for securing stability upon vertical movement of the passenger car 3 along the guide rail.

A pair of underfloor side surface beams 14A, 14B is mounted on the mount parts 10A, 10B as upper parts of the lower beam 10, which will be described in detail later, and are fixed with bolts 33 (FIG. 2). A floor of the car room 8 is mounted on the underfloor side surface beams 14A, 14B at the part indicated by a dotted frame 40 of FIG. 2 via antivibration devices 15. The underfloor side surface beams 14A, 14B are horizontally disposed inside the space defined by the opposing vertical frames 11A, 11B while extending in the front-rear direction orthogonally to the left-right direction (longitudinal direction) of the lower beam 10.

Pulley brackets 16A, 16B are fixed to the lower surfaces of the underfloor side surface beams 14A, 14B with bolts 34, respectively. The under-car pulleys 4A, 4B are rotatably journaled to the pulley brackets 16A, 16B. A rope guide 17 is fixed with bolts 35 below the pulley brackets 16A, 16B so as to be connected to each other. The rope guide 17 is configured to prevent foreign matters from being caught in the main rope 2 wound around the under-car pulleys 4A, 4B.

Figure 4:
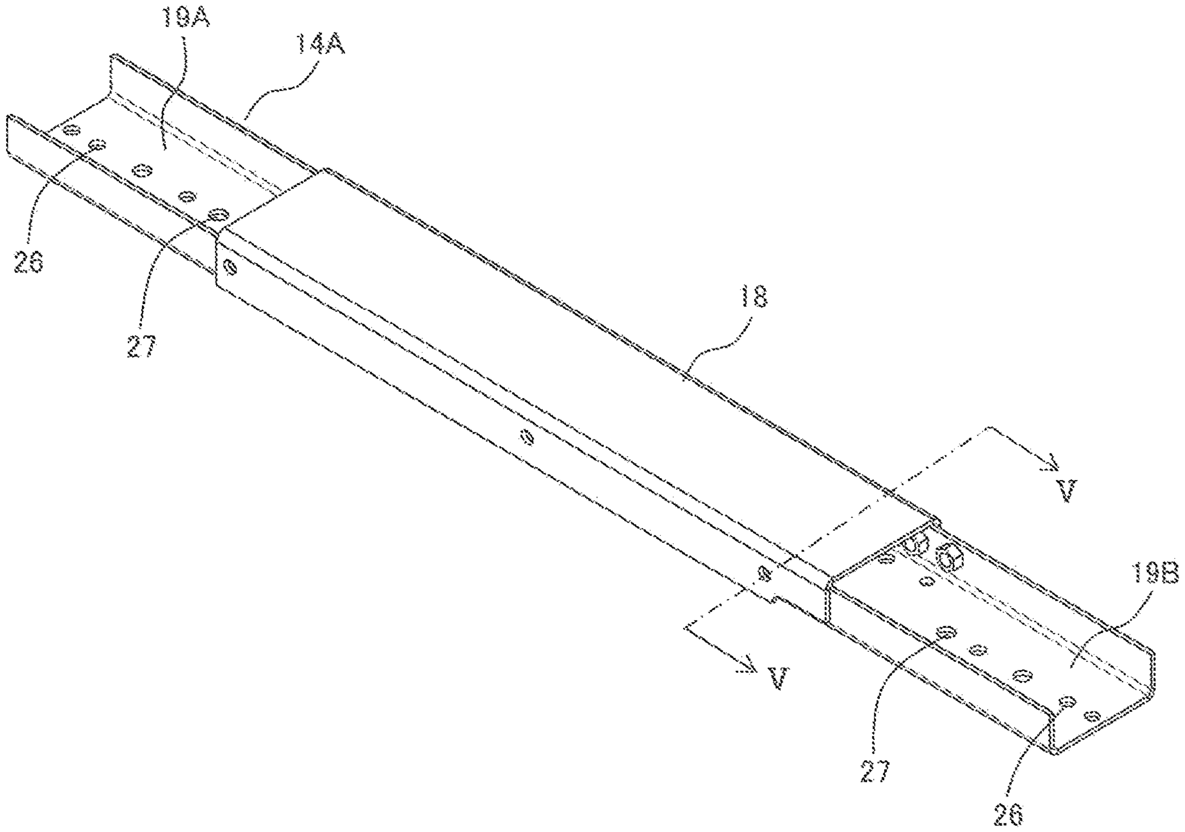
FIG. 4 is an overall perspective view of an underfloor side surface beam according to an embodiment of the present invention.
Figure 5:
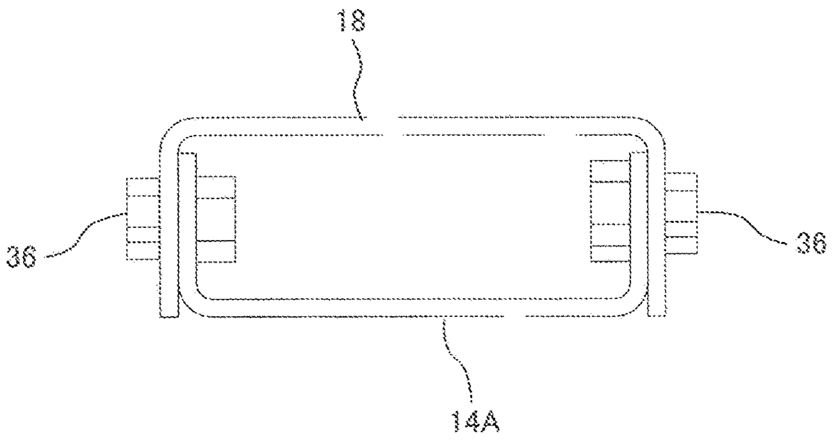
FIG. 5 is a sectional view taken along line V-V of FIG. 4.

The structure of the underfloor side surface beam will be described referring to FIGS. 4 and 5. FIG. 4 is an overall perspective view of the underfloor side surface beam according to the embodiment of the present invention. FIG. 5 is a sectional view taken along line V-V of FIG. 4. The underfloor side surface beam 14A has a U-shaped section cut in the direction orthogonal to the longitudinal direction, which is reinforced while having an upwardly directed open section.

An underfloor side surface beam reinforcing member 18 has a U-shaped section cut in the direction orthogonal to the longitudinal direction reinforced while having a downwardly directed open section disposed opposingly to the upwardly directed open section of the underfloor side surface beam 14A. The underfloor side surface beam reinforcing member 18 is formed to have a width of the section cut orthogonally to the longitudinal direction larger than a width of the underfloor side surface beam 14A. The underfloor side surface beam reinforcing member 18 and the underfloor side surface beam 14A are arranged to have the respective open sections opposite to each other so that the underfloor side surface beam 14A is inserted to be fitted with the inside of the underfloor side surface beam reinforcing member 18. Each of the inner side surfaces of the underfloor side surface beam reinforcing member 18 and each of the outer side surfaces of the underfloor side surface beam 14A are opposingly joined and fixed with bolts 36.

The underfloor side surface beam reinforcing member 18 is formed to have its longitudinal direction length shorter than that of the underfloor side surface beam 14A, and located in the center of the underfloor side surface beam 14A. Because of difference in the longitudinal direction length between the underfloor side surface beam 14A and the underfloor side surface beam reinforcing member 18, both ends each having no opposing section of the underfloor side surface beam reinforcing member 18 disposed above serve as areas on which the floor of the car room 8 is mounted via the antivibration devices 15 to be described in detail later.

The underfloor side surface beam 14A is reinforced by the underfloor side surface beam reinforcing member 18 in the form of a simple fitting structure without largely changing the outer appearance configuration. The underfloor side surface beam is mounted on the lower beam 10 at the section reinforced by the underfloor side surface beam reinforcing member 18. Accordingly, it is possible to impart sufficient strength to both the underfloor side surface beams 14A, 14B using the relatively simple configuration with small number of components.

Although not shown in the drawing, the other underfloor side surface beam 14B is similarly configured to the underfloor side surface beam 14A as described above.

Connection of the lower beam 10 to the underfloor side surface beams 14A, 14B will be further described referring to FIGS. 2 and 3. As FIGS. 2 and 3 illustrate, each of the underfloor side surface beams 14A, 14B is longitudinally longer than the underfloor side surface beam reinforcing member 18, and fixed onto the lower beam 10 each at the section reinforced by the underfloor side surface beam reinforcing member 18.

Since each of the underfloor side surface beams 14A, 14B is longitudinally longer than the underfloor side surface beam reinforcing member 18, antivibration device mount sections 19A, 19B are formed on both longitudinal direction ends each having no opposing section of the underfloor side surface beam reinforcing member 18 disposed above. Corresponding to the dotted frame 40 shown in FIG. 2, the antivibration devices 15 are disposed on the antivibration device mount sections 19A, 19B, on which the floor of the car room 8 is mounted via the antivibration devices 15. The antivibration device 15 is made of an elastic body such as a coil spring, rubber, and the like.

Figure 6:
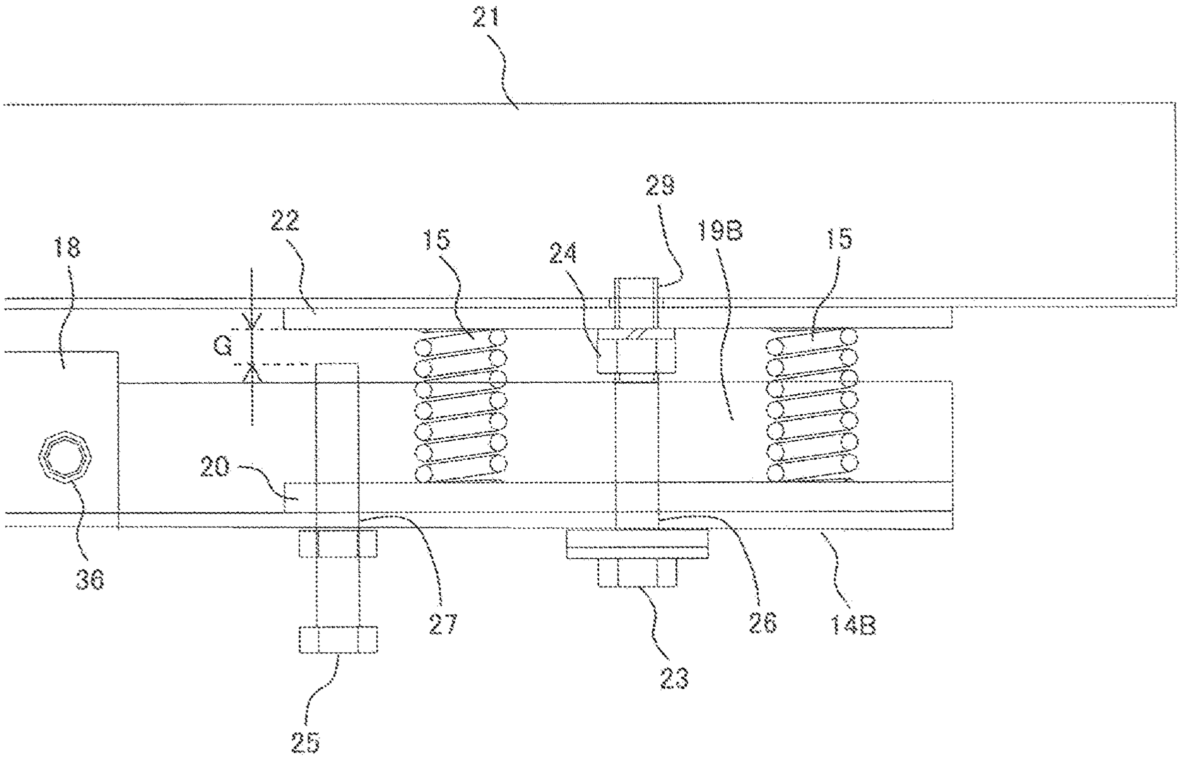
FIG. 6 is a partially enlarged view of an area as a dotted frame 40 of FIG. 2.

FIG. 6 is a partially enlarged view of the dotted frame of FIG. 2. A reinforcing plate 20 serving as a panel is disposed on the bottom of the underfloor side surface beam 14B at the antivibration device mount section 19B. Another reinforcing plate 22 corresponding to the reinforcing plate 20 is disposed below the lower surface of a floor 21 of the car room 8. The multiple antivibration devices 15 intervene between the opposing reinforcing plates 20 and 22. A stopper bolt 23 is inserted through a hole 26 formed in the bottom of the underfloor side surface beam 14B and the reinforcing plate 20. A leading end of the stopper bolt 23, which is screwed with a nut 24, is inserted into a hole 29 of the floor 21 while having the nut 24 around the leading end in contact with the lower surface of the reinforcing plate 22 for preventing the slipping-off.

An adjusting jack bolt 25 is inserted into the other hole 27 formed in the bottom of the underfloor side surface beam 14B and the reinforcing plate 20. A gap G (opening) is formed between a leading end of the adjusting jack bolt 25 and the reinforcing plate 22 for adjusting a flexure amount of the antivibration device 15. The adjusting jack bolt 25 holds the space between the reinforcing plates 20 and 22 when the elevator is in operation so that the floor 21 of the car room 8 is supported with the antivibration devices 15. The vibration of the passenger car 3 thus can be absorbed by the antivibration device 15. When replacing the antivibration device 15, the adjusting jack bolt 25 is rotated to reduce the gap G so that the leading end of the adjusting jack bolt 25 is brought into abutment on the reinforcing plate 22. The adjusting jack bolt 25 is further rotated to bring the reinforcing plate 22 and the antivibration device 15 into the non-contact state. In this state, the passenger car 3 is lifted by the adjusting jack bolt 25 so that the old antivibration device 15 which has been used in the state is replaced with a new antivibration device 15. Thereafter, the adjusting jack bolt 25 is rotated in reverse until the predetermined gap G between the leading end of the adjusting jack bolt 25 and the reinforcing plate 22 is restored to bring the reinforcing plate 22 into contact with the antivibration device 15.

Although not described herein, the underfloor side surface beam 14A is also similarly configured.

As described above, the embodiment includes the upper beam 9 disposed at an upper side, the pair of vertical frames 11A, 11B having upper ends connected to both ends of the upper beam 9 in a longitudinal direction, the lower beam 10 disposed between lower ends of the pair of vertical frames 11A, 11B while having both ends connected thereto, and the pair of underfloor side surface beams 14A, 14B which is mounted and connected onto the both ends of the lower beam 10 while extending in a direction orthogonal to the lower beam 10. The car room 8 is disposed at a part defined by the upper beam 9, the pair of vertical frames 11A, 11B, and the lower beam 10. The car room 8 is mounted on the pair of underfloor side surface beams 14A, 14B. The underfloor side surface beam reinforcing member 18 is provided for each of the pair of underfloor side surface beams 14A, 14B so as to be reinforced. The underfloor side surface beam reinforcing member 18 is located in at least each center of the underfloor side surface beams 14A, 14B.

The structure allows the underfloor side surface beams 14A, 14B to be reinforced by the underfloor side surface beam reinforcing member 18 without largely changing the configuration. The section rigidity of an area around the center to which the stress is applied intensively can be sufficiently enhanced with the simple configuration with small number of components.

In the embodiment, in addition to the above-described structure, the pair of underfloor side surface beams 14A, 14B has the U-shaped section cut in the direction orthogonal to the longitudinal direction, having an upwardly directed open section. The underfloor side surface beam reinforcing member 18 has the U-shaped section cut in the direction orthogonal to the longitudinal direction, having the downwardly directed open section to be opposite to each of the open sections of the pair of underfloor side surface beams 14A, 14B.

In the structure, the underfloor side surface beams 14A, 14B of U-shaped section, and the underfloor side surface beam reinforcing member 18 of U-shaped section are arranged to have the respective open sections are opposite to each other. This makes it possible to further enhance each section rigidity of the underfloor side surface beams 14A, 14B.

In the embodiment, in addition to the above-described structure, each longitudinal direction length of the pair of underfloor side surface beams 14A, 14B is longer than the longitudinal direction length of the underfloor side surface beam reinforcing member 18. The antivibration devices are disposed on both ends of each of the pair of underfloor side surface beams 14A, 14B, each end having no opposing section of the underfloor side surface beam reinforcing member 18 disposed above for accommodating the car room 8 via the antivibration devices 15.

The structure allows provision of the antivibration devices 15 to provide the passenger car 3 with less vibrations by enhancing each section rigidity of the underfloor side surface beams 14A, 14B.

In the embodiment, in addition to the above-described structure, the reinforcing plate 22 is disposed below the lower surface of the car room 8. The adjusting jack bolt 25 is inserted into the hole 27 formed in each bottom at both ends of the pair of underfloor side surface beams 14A, 14B.

The structure allows easy adjustment of the flexure amount of the antivibration device 15 by regulating the gap between the adjusting jack bolt 25 and the reinforcing plate 22. Furthermore, regulation of the gap between the adjusting jack bolt 25 and the reinforcing plate 22 allows easy detachment or attachment of the antivibration device 15.

The present invention is not limited to the embodiment as described above, and includes various modifications. For example, the embodiment is described in detail for readily understanding of the present invention which is not necessarily limited to the one equipped with all structures as described above. It is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

REFERENCE SIGNS LIST

7 . . . car frame,
8 . . . car room,
9 . . . upper beam,
10 . . . lower beam,
10A, 10B . . . mount part,
11A, 11B . . . vertical frame,
14A, 14B . . . underfloor side surface beam,
15 . . . antivibration device,
16A, 16B . . . pulley bracket,
17 . . . rope guide,

18 . . . underfloor side surface beam reinforcing member,
19A, 19B . . . antivibration device mount section,
20, 22 . . . reinforcing plate,
21 . . . floor,
25 . . . adjusting jack bolt

The invention claimed is:

1. An elevator passenger car comprising an upper beam disposed at an upper side, a pair of vertical frames having upper ends connected to both ends of the upper beam in a longitudinal direction, a lower beam disposed between lower ends of the pair of vertical frames while having both ends connected, and a pair of underfloor side surface beams which is mounted and connected onto the both ends of the lower beam while extending in a direction orthogonal to the lower beam, the elevator passenger car having a car room disposed at a part defined by the upper beam, the pair of vertical frames, and the lower beam, the car room being mounted on the pair of underfloor side surface beams, wherein an underfloor side surface beam reinforcing member is provided for each of the pair of underfloor side surface beams so as to be reinforced, wherein each of the pair of underfloor side surface beams has a U-shaped section cut in a direction orthogonal to the longitudinal direction, having an upwardly directed open section; and the underfloor side surface beam reinforcing member has a U-shaped section cut in a direction orthogonal to the longitudinal direction, having a downwardly directed open section to be opposite to each of the open sections of the pair of underfloor side surface beams.

2. The elevator passenger car according to claim 1, wherein the underfloor side surface beam reinforcing member has a width of the section cut in the direction orthogonal to the longitudinal direction, which is larger than a width of each of the pair of underfloor side surface beams.

3. The elevator passenger car according to claim 2, wherein as for each of the underfloor side surface beam reinforcing member and the pair of underfloor side surface beams, each inner side surface of the underfloor side surface beam reinforcing member and each outer side surface of the pair of underfloor side surface beams are opposingly joined and fixed with bolts.

4. The elevator passenger car according to claim 1, wherein each longitudinal direction length of the pair of underfloor side surface beams is longer than a longitudinal direction length of the underfloor side surface beam reinforcing member; and antivibration devices are disposed on both ends of each of the pair of underfloor side surface beams, each end having no opposing section of the underfloor side surface beam reinforcing member disposed above for accommodating a floor of the car room via the antivibration devices.

5. The elevator passenger car according to claim 4, wherein a reinforcing plate is disposed below a lower surface of the car room; and an adjusting jack bolt for adjusting a gap from the reinforcing plate is inserted into a hole formed in each bottom at both ends of the pair of underfloor side surface beams.

6. An elevator comprising a hoisting machine, a main rope wound around the hoisting machine, an elevator passenger car according to claim 1 provided at one side of the main rope, and a balance weight provided at the other side of the main rope.

7. The elevator according to claim 6, wherein a pair of pulley brackets to which under-car pulleys is respectively rotatably journaled are provided below each lower surface of the pair of underfloor side surface beams, and the main rope is suspended with the under-car pulleys.

8. The elevator according to claim 7, wherein a rope guide for connecting the pair of pulley brackets is fixed below the pair of pulley brackets.

* * * * *